US010242790B2

(12) United States Patent
Oliveira da Fonseca

(10) Patent No.: US 10,242,790 B2
(45) Date of Patent: Mar. 26, 2019

(54) GEOMETRICALLY CONFIGURABLE MULTI-CORE INDUCTOR AND METHODS FOR TOOLS HAVING PARTICULAR SPACE CONSTRAINTS

(71) Applicant: Halliburton Energy Services, Inc., Houston, TX (US)

(72) Inventor: Fernando Oliveira da Fonseca, Great Malvern (GB)

(73) Assignee: Halliburton Energy Services, Inc., Houston, TX (US)

(*) Notice: Subject to any disclaimer, the term of this patent is extended or adjusted under 35 U.S.C. 154(b) by 245 days.

(21) Appl. No.: 15/302,391

(22) PCT Filed: May 15, 2015

(86) PCT No.: PCT/US2015/031169
§ 371 (c)(1),
(2) Date: Oct. 6, 2016

(87) PCT Pub. No.: WO2016/186624
PCT Pub. Date: Nov. 24, 2016

(65) Prior Publication Data
US 2017/0133147 A1 May 11, 2017

(51) Int. Cl.
*E21B 47/12* (2012.01)
*H01F 27/28* (2006.01)
(Continued)

(52) U.S. Cl.
CPC ......... *H01F 27/2823* (2013.01); *E21B 47/00* (2013.01); *E21B 47/122* (2013.01);
(Continued)

(58) Field of Classification Search
CPC ........ E21B 47/12; E21B 47/122; E21B 47/00; G01V 3/28; H01F 41/02; H01F 41/071; H01F 41/08; H01F 27/28
See application file for complete search history.

(56) References Cited

U.S. PATENT DOCUMENTS 5,621,844 A * 4/1997 Bridges .................. E21B 36/04 166/60
6,163,238 A 12/2000 Nestlerode
(Continued)

FOREIGN PATENT DOCUMENTS

CN 102714439 A 10/2012
CN 102928888 A 2/2013
(Continued)

OTHER PUBLICATIONS

International Search Report and The Written Opinion of the International Search Authority, or the Declaration, dated Feb. 15, 2016, PCT/US2015/031169, 13 pages, ISA/KR.
(Continued)

*Primary Examiner* — Catherine Loikith
(74) *Attorney, Agent, or Firm* — Haynes and Boone, LLP

(57) ABSTRACT

A number of toroidal ferromagnetic cores for an inductor may be arranged to form a ferromagnetic multi-core array, through which a calculated sequence of wire turns is wound. The array may be structured within certain permitting geometries, to a preferred geometrical shape for use within a downhole tool. The array of cores can take any practical form, include square, rectangular, hexagonal, circular, or the like, as long as the magnetic fluxes of all coils wound about a given core create a magnetic flux within the core that flows in the same direction within the core.

19 Claims, 10 Drawing Sheets

(51) Int. Cl.

| | |
|---|---|
| ***G01V 3/28*** | (2006.01) |
| ***H01F 3/10*** | (2006.01) |
| ***H01F 17/06*** | (2006.01) |
| ***E21B 47/00*** | (2012.01) |
| ***H01F 41/08*** | (2006.01) |

(52) U.S. Cl.
CPC ............. *H01F 3/10* (2013.01); *H01F 17/062* (2013.01); *H01F 27/2895* (2013.01); *H01F 41/08* (2013.01)

(56) References Cited

U.S. PATENT DOCUMENTS

| | | | |
|---|---|---|---|
| 2003/0076202 | A1 | 4/2003 | Haugs et al. |
| 2006/0264069 | A1 | 11/2006 | Magnus et al. |
| 2007/0051897 | A1 | 3/2007 | Nagayama et al. |
| 2010/0060404 | A1 | 3/2010 | Raiser et al. |
| 2012/0274171 | A1 | 11/2012 | Ishikawa et al. |

FOREIGN PATENT DOCUMENTS

| | | | |
|---|---|---|---|
| CN | 1248246 | C | 3/2016 |
| JP | H11186055 | A | 7/1999 |
| WO | WO 2012/064398 | A1 | 5/2012 |

OTHER PUBLICATIONS

Office Action issued for Chinese Patent Application No. 201580078290.4, dated Aug, 2, 2018, 13 pgs.

* cited by examiner

GEOMETRICALLY CONFIGURABLE MULTI-CORE INDUCTOR AND METHODS FOR TOOLS HAVING PARTICULAR SPACE CONSTRAINTS

PRIORITY

The present application is a U.S. National Stage patent application of International Patent Application No. PCT/US2015/031169, filed on May 15, 2015, the benefit of which is claimed and the disclosure of which is incorporated herein by reference in its entirety.

TECHNICAL FIELD

The present disclosure relates generally to oilfield equipment, and in particular to downhole tools, drilling and related systems and techniques for drilling, completing, servicing, and evaluating wellbores in the earth.

BACKGROUND

During the drilling, completion, servicing, or evaluation of an oil or gas wellbore or the like, situations are encountered in which it may be desirable to provide measurement data or perform other operations. A logging tool, which may have one or more devices, which may include instruments, detectors, circuits, and the like, may be carried along a drill string, a bottom hole assembly, or a wireline cable, for example, and lowered into a wellbore for taking and communicating measurements at various wellbore depths and/or performing other functions.

For example, measurements may be taken in real time during drilling operations. Such techniques may be referred to as measurement while drilling ("MWD") or logging while drilling ("LWD"). Measurement data and other information may be communicated through fluid within the drill string or annulus using various telemetry techniques and converted to electrical signals at the surface.

Downhole tools may also generally provide fluid flow paths to support various operations. Because of inherent size restrictions, downhole tools may have limited cross-sectional area to provide desired functionality while requiring larger components or devices, including inductors.

BRIEF DESCRIPTION OF THE DRAWINGS

Embodiments are described in detail hereinafter with reference to the accompanying figures, in which.

DETAILED DESCRIPTION

Figure 1:
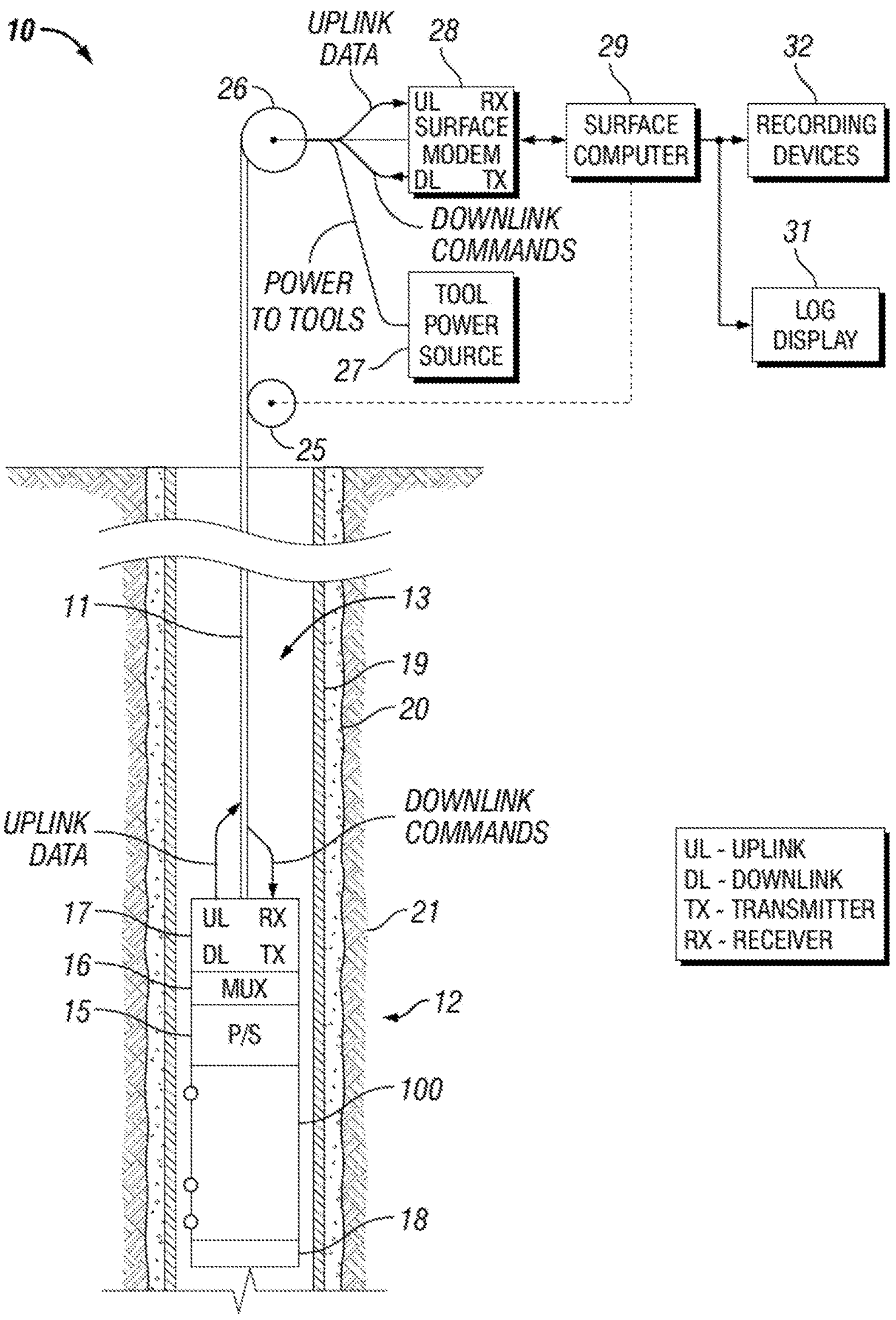
FIG. 1 is a block-level elevation view in partial cross-section of a well logging system according to an embodiment, showing a logging tool suspended by wireline in a well and incorporating a downhole tool.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

FIG. 1 shows an exemplary elevation view of a well logging system according to one or more embodiments. The system shown in FIG. 1 is identified by the numeral 10, which generally refers to a well logging system.

Figure 2:
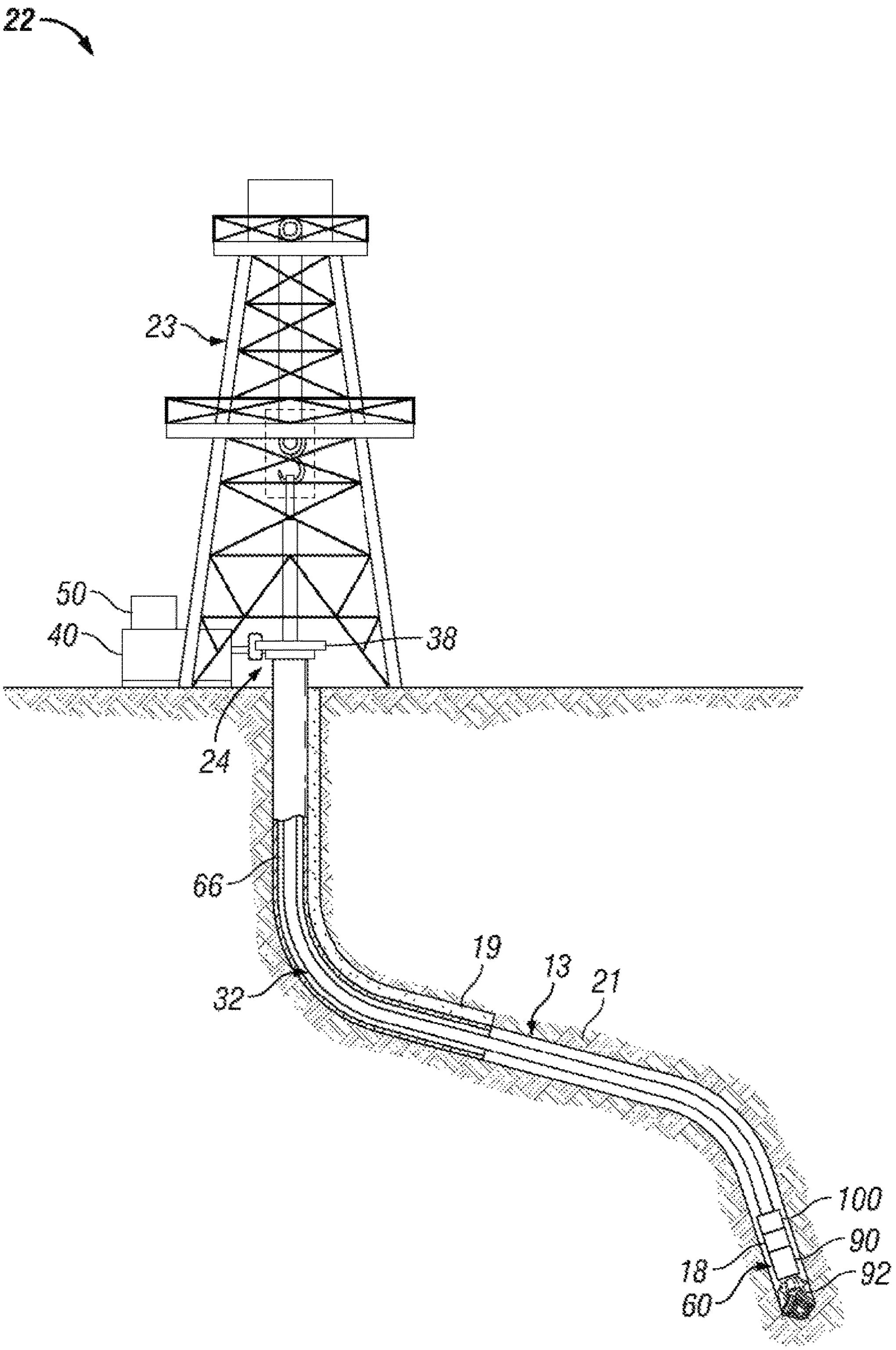
FIG. 2 is an elevation view in partial cross-section of a logging while drilling system according to an embodiment, showing a drill string and a drill bit for drilling a bore in the earth and a downhole tool carried along the drill string.

A logging cable 11 may suspend a housing 12 in a wellbore 13. Wellbore 13 may be drilled by a drill bit on a drill string as illustrated in FIG. 2, and wellbore 13 may be lined with casing 19 and a cement sheath 20. Housing 12 may have a protective housing which may be fluid tight, be pressure resistant, and support and protect internal components during deployment. Housing 12 may enclose one or more logging systems to generate data useful in analysis of wellbore 13 or in determining the nature of the formation 21 in which wellbore 13 is located. Other downhole tools may also be provided.

In one or more embodiments, logging tool 100 may be provided, for providing any number of wellbore inspections, analyses, or operations. Other types of tools 18 may also be included in housing 12. Housing 12 may also enclose a power supply 15. Output data streams from logging tool 100 and other tools 18 may be provided to a multiplexer 16 located in housing 12. Housing 12 may also include a communication module 17 having an uplink communication device, a downlink communication device, a data transmitter, and a data receiver. According to one or more embodiments, housing 12 may include one or more inductors 200 as described in greater detail hereinafter.

Logging system 10 may include a sheave 25, which may be used in guiding logging cable 11 into wellbore 13. Cable 11 may be spooled on a cable reel 26 or drum for storage. Cable 11 may connect with housing 12 and be let out or taken in to raise and lower housing 12 within wellbore 13. Conductors in cable 11 may connect with surface-located equipment, which may include a DC power source 27 to provide power to tool power supply 15, a surface communication module 28 having an uplink communication device, a downlink communication device, a data transmitter and receiver, a surface computer 29, a logging display 31, and one or more recording devices 32. Sheave 25 may be connected by a suitable detector arrangement to an input to surface computer 29 to provide housing depth measuring information. Surface computer 29 may provide an output for logging display 31 and recording device 32. Surface logging system 10 may collect data as a function of depth.

Recording device 32 may be incorporated to make a record of the collected data as a function of wellbore depth.

FIG. 2 illustrates an exemplary elevation view of a measurement while drilling (MWD) or logging while drilling (LWD) system according to one or more embodiments. The system shown in FIG. 2 is identified by the numeral 22, which generally refers to a drilling system. LWD system 22 may include a land drilling rig 23. However, teachings of the present disclosure may be satisfactorily used in association with offshore platforms, semi-submersible, drill ships, or any other drilling system satisfactory for forming wellbore 13 extending through one or more downhole formations 21.

Drilling rig 23 and associated control system 50 may be located proximate a well head 24.

Drilling rig 23 may also include a rotary table 38, rotary drive motor 40, and other equipment associated with operation of drill string 32. Annulus 66 may be defined between the exterior of drill string 32 and the inside diameter of wellbore 13.

Bottom hole assembly 90 may include a downhole mud motor. Bottom hole assembly 90 and/or drill string 32 may also include various other tools that provide information about wellbore 13, such as logging or measurement data from the bottom wellbore 60. Measurement data and other information may be communicated using measurement while drilling techniques using electrical signals or other telemetry that can be converted to electrical signals at the well surface to, among other things, monitor the performance of drilling string 32, bottom hole assembly 90, and associated rotary drill bit 92.

Bottom hole assembly 90 or drill string 32 may also include various downhole tools that provide logging or measurement data and other information about wellbore 13. This data and information may be monitored by a control system 50. In one or more embodiments, housing 100 may be provided, for housing tools to perform, any number of wellbore inspections, analyses, or operations. Additionally, other various types of MWD or LWD tools 18 may be included in bottom hole assembly 90.

In particular, devices, including MWD, LWD instruments, detectors, circuits, or other tools may be provided within housing 100, according to one or more embodiments described in greater detail below. Housing 100 may be located as part of bottom hole assembly 90 or elsewhere along drill string 32. Moreover, multiple housings 100 may be provided. Although described in conjunction with drilling system 20, housing 100 may be used in any appropriate system and carried along any type of string. Housing 100 may be used to house an instrument, tool, detector, circuitry, or any other suitable device. According to one or more embodiments, housing 100 may include one or more inductors 200 as described in greater detail hereinafter.

Figure 3:
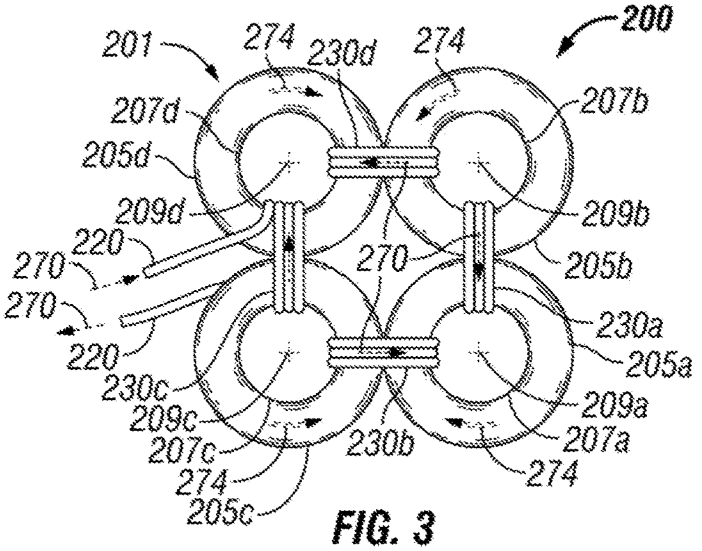
FIG. 3 is a simplified plan view of a four-core inductor in a planar 2×2 array square arrangement, according to one or more embodiments, which may be used in the systems of FIG. 1 or 2.

FIG. 3 is a simplified plan view of a four-core multicore inductor 200 according to one or more embodiments. Inductor 200 of FIG. 3 has a generally planar layout and is arranged in an array 201 of ferromagnetic cores 205 characterized by a 2×2 shape. As used herein, the terms array and lattice refer broadly to a general positional arrangement of cores to allow for shared windings. Each ferromagnetic core 205 may have a generally toroidal shape defining an aperture 207 formed therethrough along an axis 209. However, other suitably shaped ferromagnetic cores may also be used as appropriate. Toroidal cores 205 may be manufactured of various materials and processes, including primarily ferrite, powdered iron and laminated cores. In addition, toroidal cores 205 may have a circular cross section, a rectangular cross section, or other cross-sectional shape.

As can be seen, second and third ferromagnetic core course 205*b*, 205*c* are each placed in proximity to a first ferromagnetic core 205*a* so that their respective axes 209*a*-*c* are not coaxial, i.e. the cores are not forming a singular laminated core. An electrically conductive wire 220 may be wound about the cores, forming a first coil 230*a* wound about first and second cores 205*a*, 205*b* passing through first and second apertures 207*a*, 207*b* and a second coil 230*b* wound about first and third cores 205*a*, 205*c* passing through first and third apertures 207*a*, 207*c*. When a current is imposed along wire 220, as indicated by arrows 270, a magnetic flux is produced within cores 205, as indicated by double arrows 274.

In one or more embodiments, ferromagnetic cores 205 are arranged within array 201 and wire 220 is wound to form coils 230 through pairs of proximate cores 205 within array 201 so as to create an arrangement whereby all coils 230 wound about a given core 205 in array 201 operate to produce magnetic flux flowing in the same direction within the given core 205 upon imposition of an electrical current through wire 220. For this reason, in the array of FIG. 3, wire 220 is not wound to form a coil passing through the second and third apertures 207*b*, 207*c*. Such an arrangement would necessarily cause a cancellation of magnetic flux within wither core 205*b* or core 205*c*, depending on the direction such coil would be wound.

According, and one or more embodiments, a generally toroidal ferromagnetic fourth core 205*d* having a fourth aperture 207*d* formed therethrough along a fourth axis 209*d* may be disposed in proximity to third core 205*c* so that fourth axis 209*d* is not coaxial with third axis 209*c*. Wire 229 may form a third coil 230*c* wound about third and fourth cores 205*c*, 205*d* passing through third and fourth apertures 207*c*, 207*d*.

Figure 4:
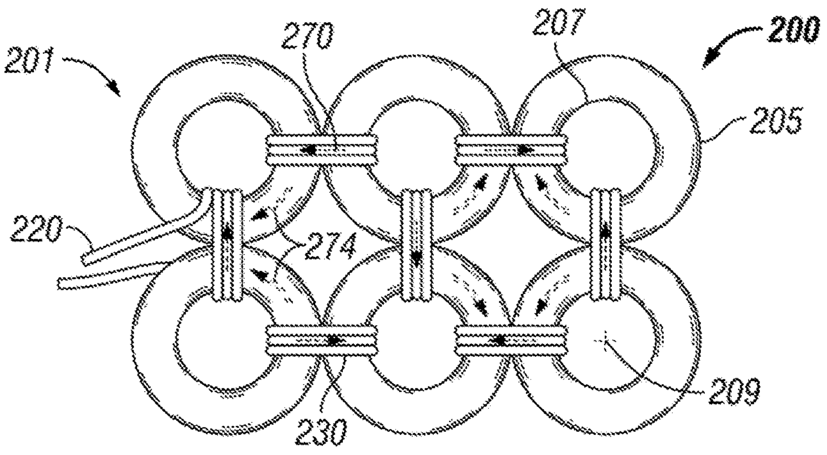
FIG. 4 is a simplified plan view of a six-core inductor in a planar 2×3 array rectangular arrangement, according to one or more embodiments, which may be used in the systems of FIG. 1 or 2.

As illustrated in FIG. 4, fourth core 205*d* may also be placed in proximity to second core 205*b* to form a square shaped 2×2 array 201. In this arrangement, wire 220 may form a fourth coil 230*d* wound about fourth and second cores 205*d*, 205*b* passing through fourth and second apertures 207*d*, 207*b*.

As illustrated hereinafter, numerous arrangements for array 201 may be possible, thereby allowing the shape of inductor 200 to be made flatter so as not to exceed a certain height, to have a fixed width and/or length, or to have a sleeve like shape, for example, whereby other components can be disposed within the center of inductor 200.

For example, FIG. 4 illustrates a simplified inductor 200 according to one or more embodiments having planar array 201 of a 2×3 array configuration of ferromagnetic cores 205. Each core 205 may define an aperture 207 along an axis 209. Electrically conductive wire 220 is wound about the six ferromagnetic cores 205 so as to form seven common coils 230. Current lines are indicated by arrows 270, and magnetic flux lines are indicated by double arrows 274.

Figure 5:
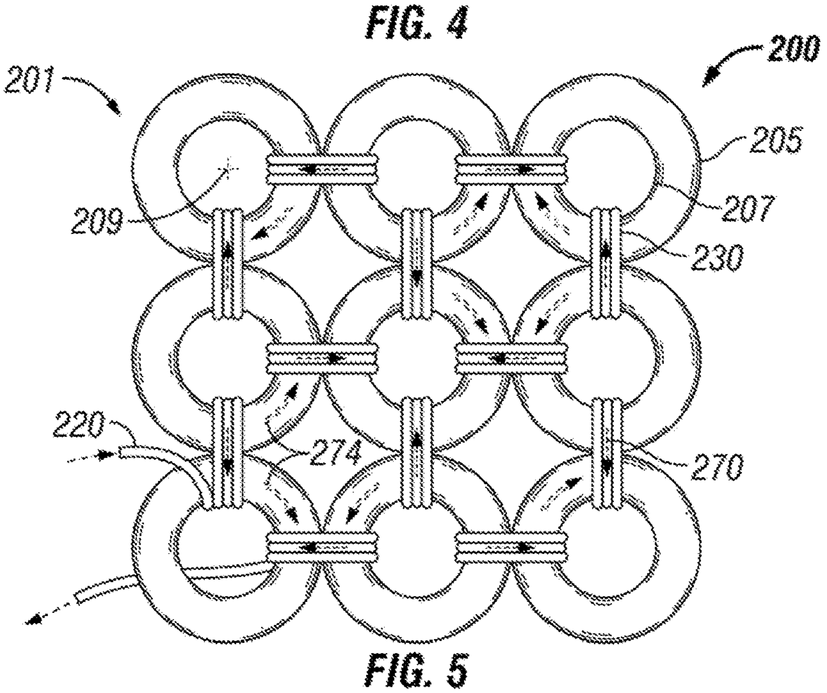
FIG. 5 is a simplified plan view of a nine-core inductor in a planar 3×3 array square arrangement, according to one or more embodiments, which may be used in the systems of FIG. 1 or 2.

Similarly, FIG. 5 illustrates a simplified inductor 200 according to one or more embodiments having planar array 201 of a 3×3 array configuration of ferromagnetic cores 205. Each core 205 may define an aperture 207 along an axis 209. Electrically conductive wire 220 is wound about the nine ferromagnetic cores 205 so as to form twelve common coils 230. Current lines are indicated by arrows 270, and magnetic flux lines are indicated by double arrows 274.

Figure 6:
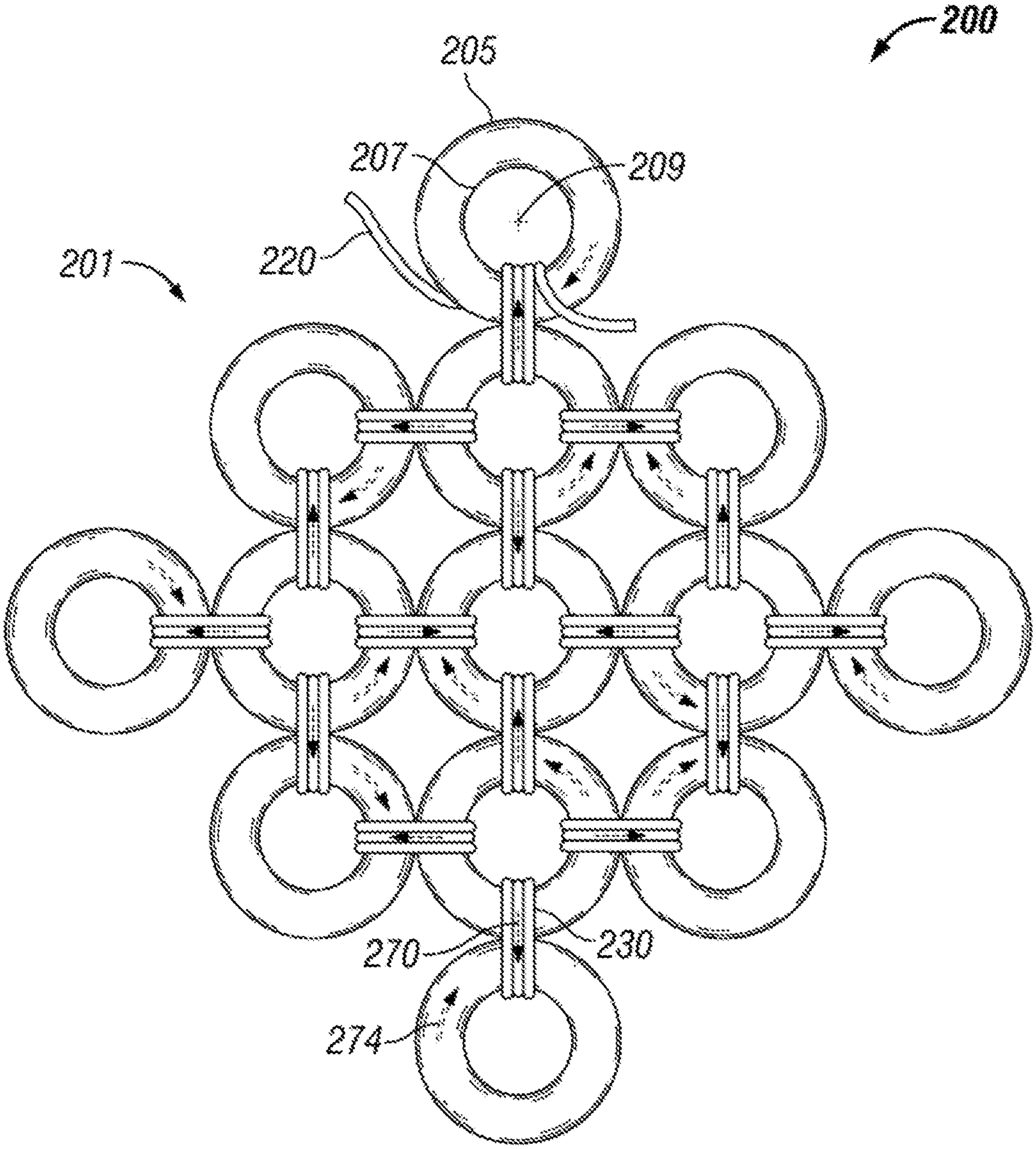
FIG. 6 is a simplified plan view of a thirteen-core inductor in a planar latticed square arrangement, according to one or more embodiments, which may be used in the systems of FIG. 1 or 2.

Inductors having arrays 201 with larger numbers of ferromagnetic cores 205 are possible. FIG. 6 illustrates a simplified inductor 200 according to one or more embodiments having planar lattice 201 of thirteen ferromagnetic cores 205. Each core 205 may define an aperture 207 along an axis 209. Electrically conductive wire 220 is wound about the thirteen ferromagnetic cores 205 so as to form sixteen common coils 230. Current lines are indicated by arrows 270, and magnetic flux lines are indicated by double arrows 274.

Figure 7:
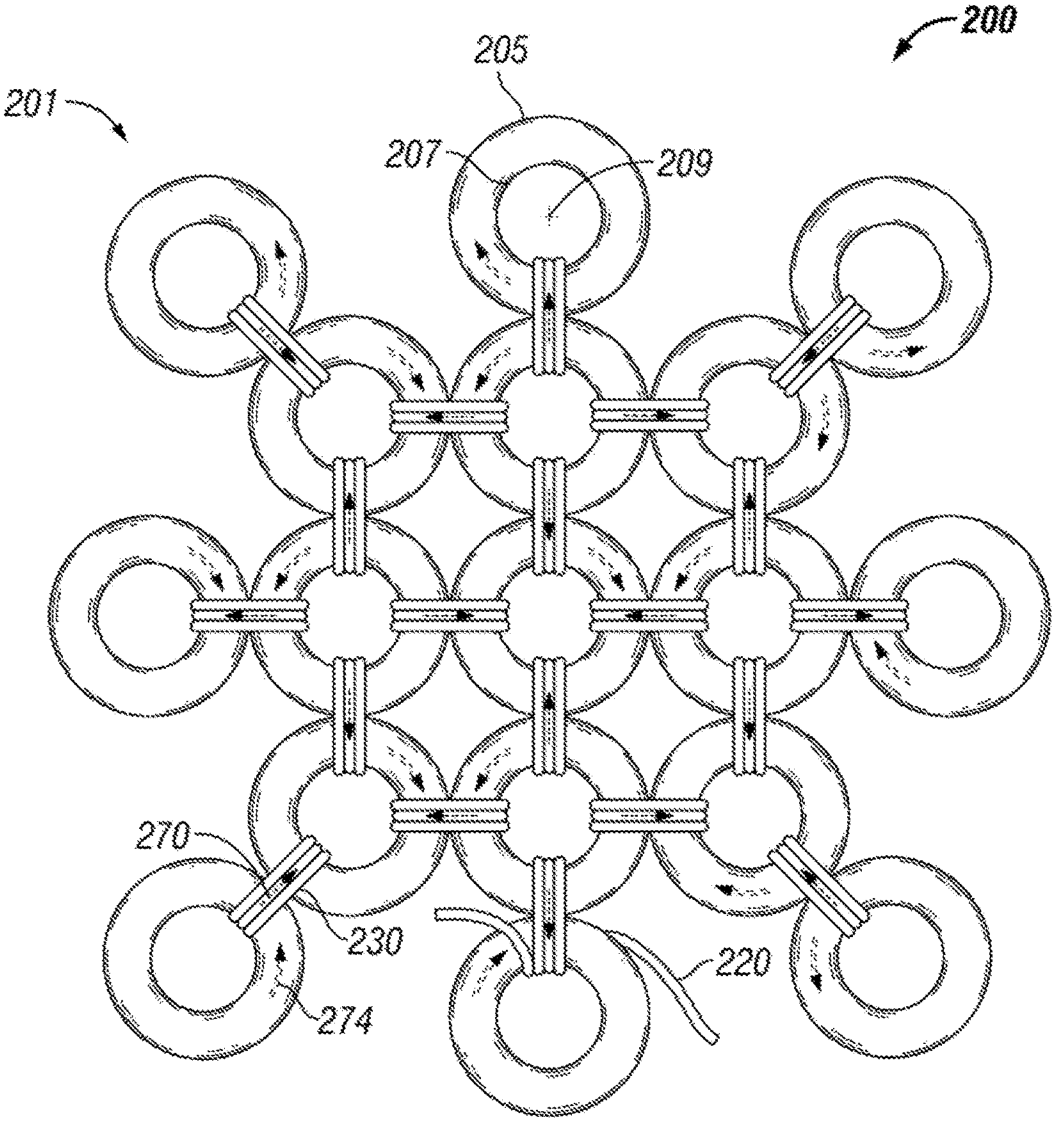
FIG. 7 is a simplified plan view of a seventeen-core inductor in a planar latticed generally circular arrangement, according to one or more embodiments, which may be used in the systems of FIG. 1 or 2.

FIG. 7 illustrates a simplified inductor 200 according to one or more embodiments having planar lattice 201 of seventeen ferromagnetic cores 205. Each core 205 may define an aperture 207 along an axis 209. Electrically conductive wire 220 is wound about the seventeen ferromagnetic cores 205 so as to form twenty common coils 230. Current lines are indicated by arrows 270, and magnetic flux lines are indicated by double arrows 274.

Figure 8:
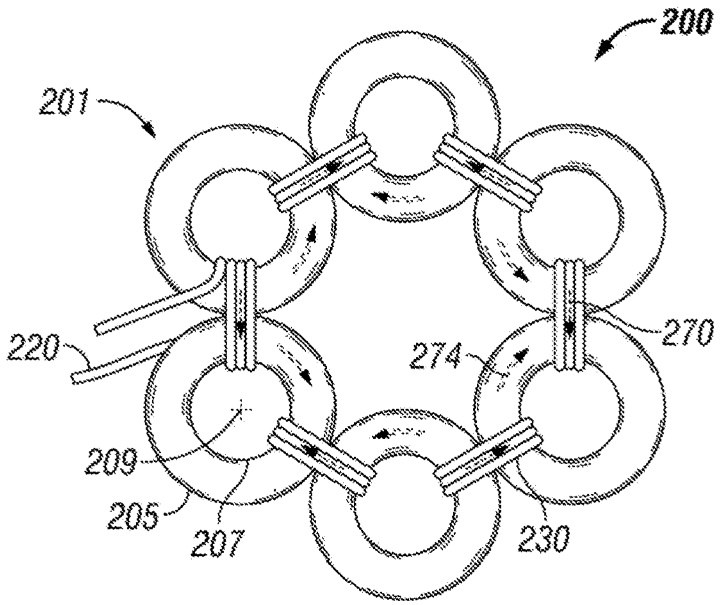
FIG. 8 is a simplified plan view of a six-core inductor in a planar hexagonal arrangement, according to one or more embodiments, which may be used in the systems of FIG. 1 or 2.

Inductors 200 having polygonal shapes, which may or may not include hollow interiors, may be possible according to one or more embodiments. For example, FIG. 8 illustrates a simplified inductor 200 according to one or more embodiments having planar array 201 of a hexagonal configuration of ferromagnetic cores 205. Each core 205 may define an aperture 207 along an axis 209. Electrically conductive wire 220 is wound about the six ferromagnetic cores 205 so as to form six common coils 230. Current lines are indicated by arrows 270, and magnetic flux lines are indicated by double arrows 274.

Figure 9:
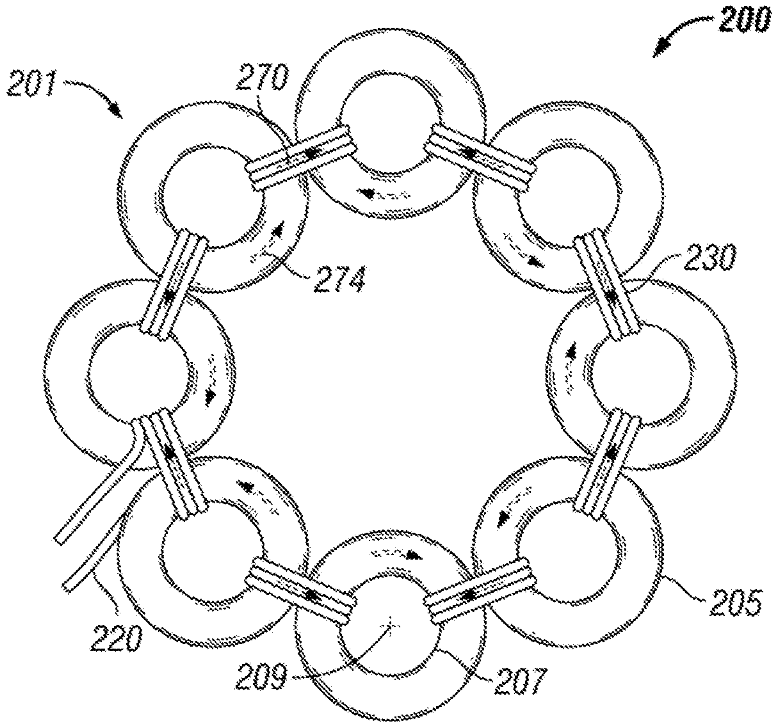
FIG. 9 is a simplified plan view of an eight-core inductor in a planar octagonal arrangement, according to one or more embodiments, which may be used in the systems of FIG. 1 or 2.

FIG. 9 illustrates a simplified inductor 200 according to one or more embodiments having planar array 201 of an octagonal configuration of ferromagnetic cores 205. Each core 205 may define an aperture 207 along an axis 209. Electrically conductive wire 220 is wound about the eight ferromagnetic cores 205 so as to form eight common coils 230. Current lines are indicated by arrows 270, and magnetic flux lines are indicated by double arrows 274.

Figure 10:
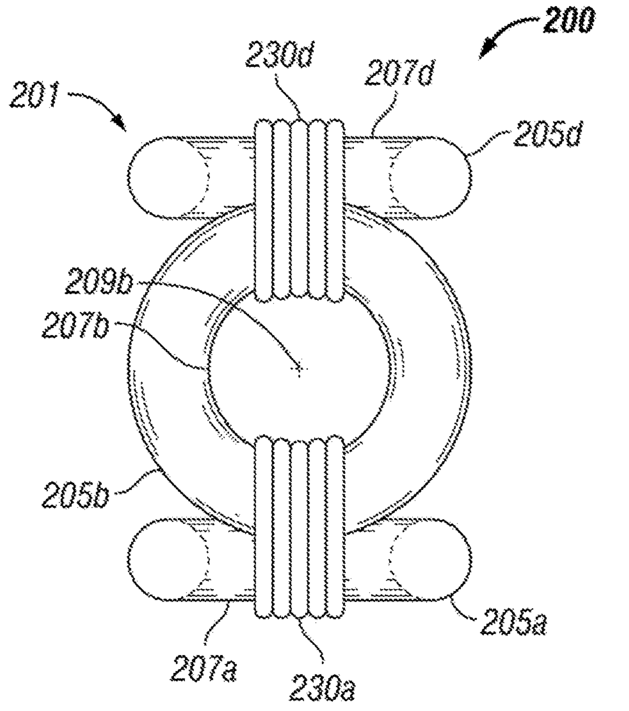
FIG. 10 is a simplified left side elevation view of a four-core inductor in a three-dimensional cubic arrangement, according to one or more embodiments, which may be used in the systems of FIG. 1 or 2.
Figure 11:
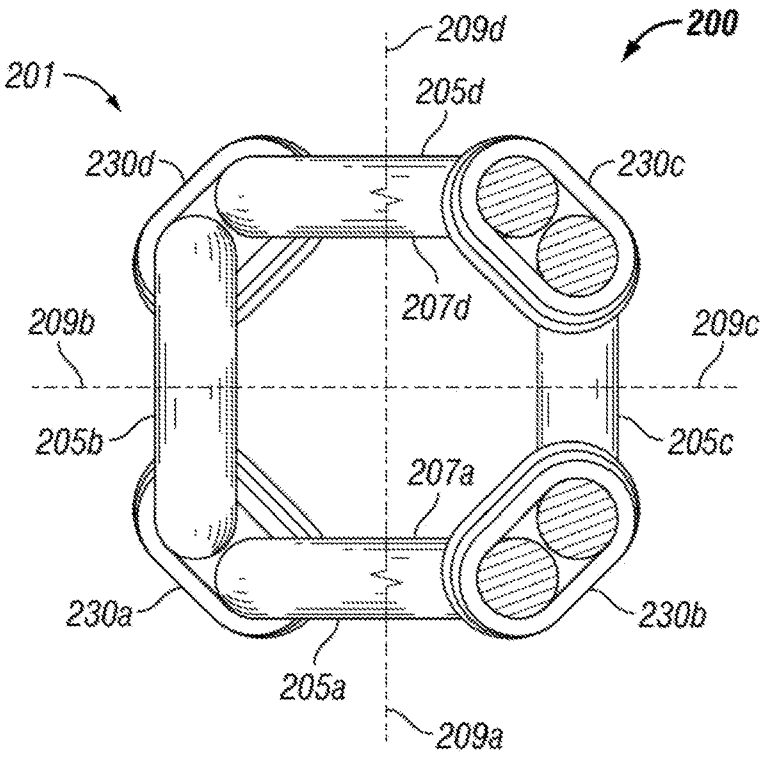
FIG. 11 is a simplified front side elevation view of the four-core three-dimensional cubic inductor of FIG. 10, shown the right hand side cut away in longitudinal cross section.

The embodiments illustrated to this point have been characterized by generally planar arrays 201. However, in one or more embodiments, arrays 201 of ferromagnetic cores 205 may be three-dimensional. For example, FIG. 10 is a left side elevation view and FIG. 11 is a front elevation view of inductor 200 characterized by a three-dimensional cubic shaped having four ferromagnetic cores 205 and four common windings 230. In the embodiment of FIGS. 10 and 11, cores 205*a* and 205*d* may be coaxial along axis 209*a*, and cores 205*b* and 205*c* may be coaxial along axis 209*b*.

Figure 12:
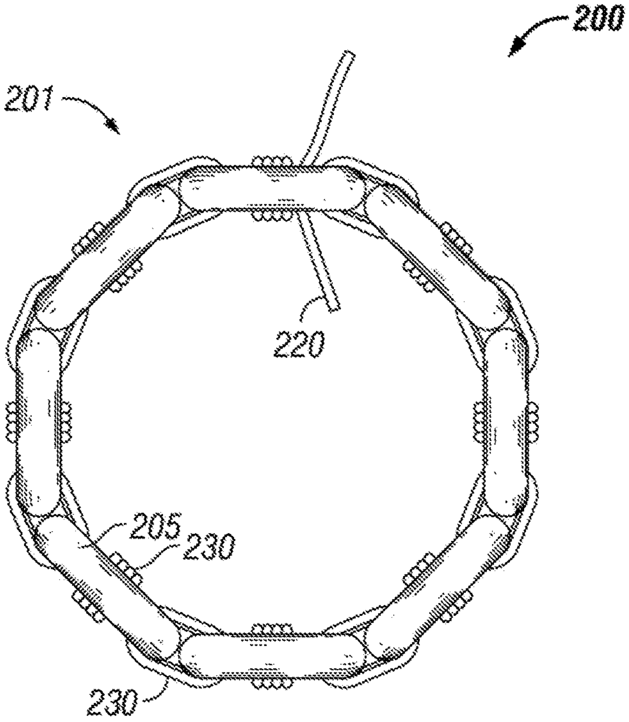
FIG. 12 is a simplified plan view of a sixteen-core inductor in a three-dimensional octagonal arrangement, according to one or more embodiments, which may be used in the systems of FIG. 1 or 2.
Figure 13:
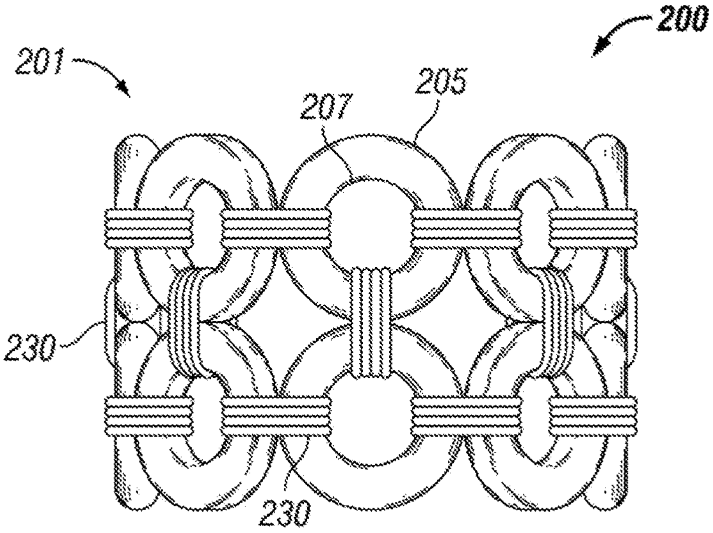
FIG. 13 is a simplified elevation view of the sixteen-core three-dimensional octagonal inductor of FIG. 12.

FIGS. 12 and 13 illustrate another three-dimensional embodiment. FIG. 12 is a simplified plan view, and FIG. 13 is a simplified elevation view, of an octagonal inductor 200 characterized by a double stack of vertically arranged cores 205. Although 16 cores 205 and twenty-four common windings 230 are provided in this arrangement, additional stacks may also be added. The embodiments of FIGS. 12 and 13 may advantageously allow for a large flow path, for drilling fluids and the like, to be provided within the middle of inductor 200.

The illustrated embodiment up to this point are been simplified, in that singular windings of wire 220 about ferromagnetic cores 205 have not been illustrated. According to one or more embodiments, in addition to common windings 230, which are wound about pairs of ferromagnetic cores 205, each core 205 may include individual windings of wire 220 for creating additional impedance. For example, referring to FIG. 14, a 2×2 planar array 201 of four ferromagnetic cores 205 is shown. Each core 205 includes two common windings 230, individual windings 232 about an outer-facing portion of core 205, and individual windings 234 about an inner-facing portion of core 205, all formed by electrically conductive wire 220.

Figure 15:
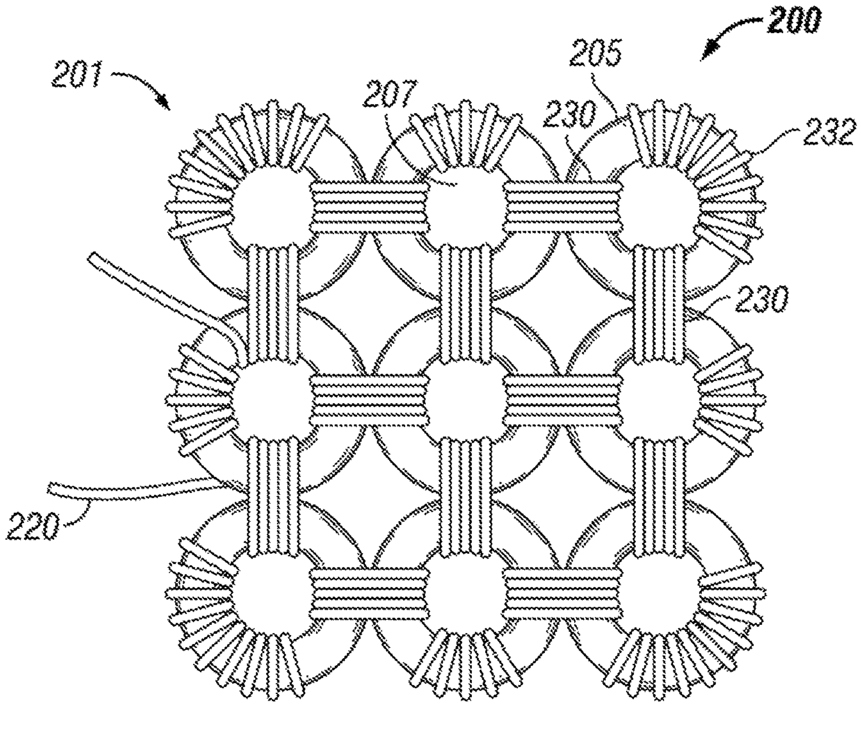
FIG. 15 is a plan view of a nine-core inductor in a planar 3×3 array arrangement, according to one or more embodiments, showing additional windings formed about the outward-facing portions of the individual cores to provide additional inductance.

In some embodiments, it may be impractical, due to the array geometry, wire gauge, number of turns/coil, and/or aperture sizes to include individual windings about inner-facing portions of cores 205. For example referring to FIG. 15, a 3×3 planar array 201 of nine ferromagnetic cores 205 is shown. Each core 205 includes two or three common windings 230, and individual windings 232 about an outer-facing portion of core 205, all formed by electrically conductive wire 220. Insufficient room for inner-facing individual windings is provided in the exemplary arrangement.

Figure 16:
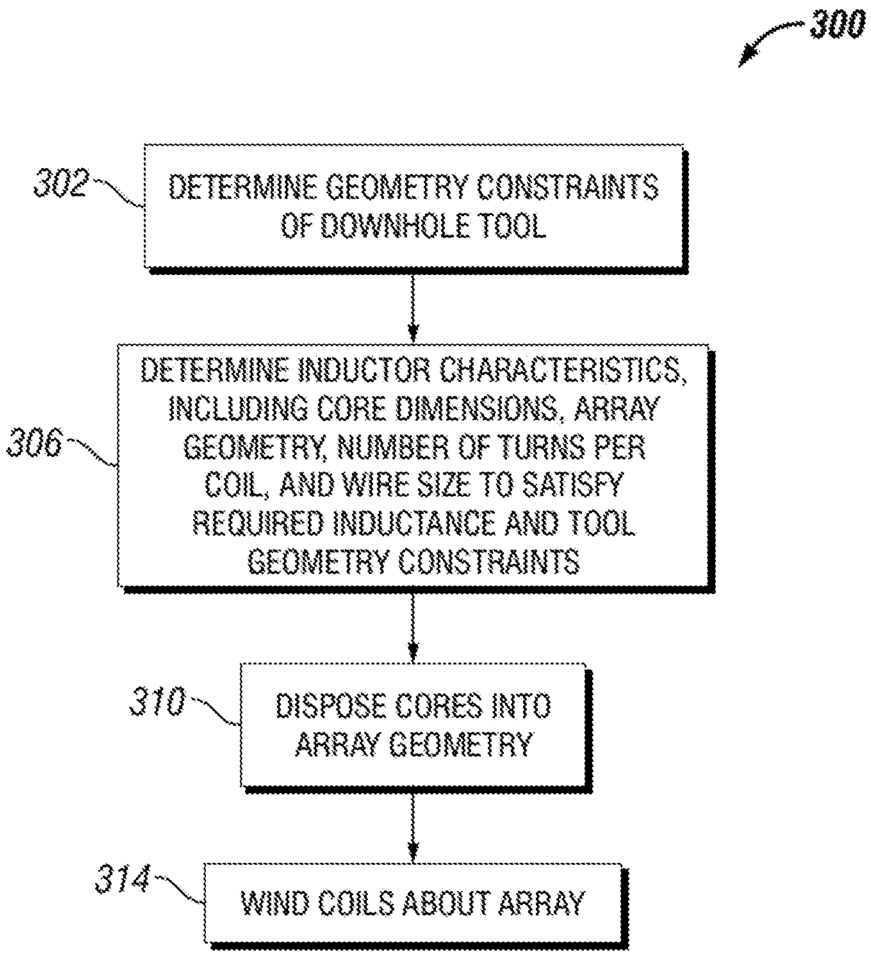
FIG. 16 is a flowchart of a method for producing a multi-core inductor according to an embodiment.

FIG. 16 is a flowchart that outlines a method 300 for forming a multi-core inductor according to an embodiment. At step 302, various geometrical and size constraints of a downhole tool, such as dimensions of housing 100 (FIG. 2), other components, printed circuit boards, and the like may be determined.

Figure 14:
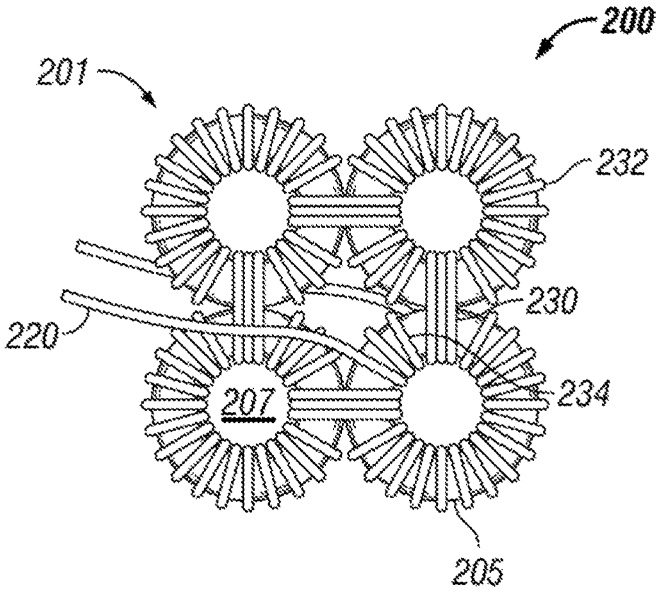
FIG. 14 is a plan view of a four-core inductor in a planar 2×2 array arrangement, according to one or more embodiments, showing additional windings formed both about the inward- and outward-facing portions of the individual cores to provide additional inductance.

Referring to FIGS. 14 and 16, at step 306, the characteristics of inductor 200, including materials and dimensions of ferromagnetic cores 205, number of common coils 230 and turns per common coil 230, gauge of wire 220, and number of individual turns 232, 234 per core 205, may be determined, by calculation, simulation, or experiment, for example, to provide a desired inductance and yet still satisfy tool geometrical constraints. As disclosed herein, a number of toroidal ferromagnetic cores may be arranged to form a ferromagnetic multi-core lattice or array, through which a calculated sequence of wire turns may wound. The array may be structured within certain permitting geometries to a particular designed shape so that the inductor can, for example, be made flatter or "quasi planar" must the component not exceed a certain height, or set to a fixed width and therefore made longer or taller. There is no limit to the maximum number of cores in an array. Also, the array may take any practical form, including square, rectangular, hexagonal, etc., so long as the magnetic fluxes of two or more coils wound about a given core work to produce magnetic flux flow in the same direction within the core. In one or more embodiments, the same number of turns per core are provided so as to maintain an even flux density distribution across the array.

At step 310, a generally toroidal ferromagnetic first core 205 having a first aperture 207 formed therethrough along a first axis 209 is provided. A generally toroidal ferromagnetic second core having a second aperture formed therethrough along a second axis may be disposed in proximity to the first core so that the second axis is not coaxial with the first axis. Similarly, a generally toroidal ferromagnetic third core having a third aperture formed therethrough along a third axis may be disposed in proximity to the first core so that the third axis is not coaxial with the first axis, and a generally toroidal ferromagnetic fourth core having a fourth aperture formed therethrough along a fourth axis may be disposed in proximity to the third core so that the fourth axis is not coaxial with the third axis. Remaining cores 205 are similarly disposed to form array 201.

At step 314, an electrically conductive wire 220 may be wound to form a first common coil 230 about the first and second cores 205 passing through the first and second apertures 207, a second common coil 230 about the first and third cores 205 passing through the first and third apertures 207, and a third common coil 230 about the third and fourth cores 205 passing through the third and fourth apertures 207. A fourth common coil 230 may also be wound with wire 220 about the second and fourth cores 205 passing through the second and fourth apertures 207. Wire 220 may also make individual turns 232, 234 about cores 205, as appropriate.

Whereas a traditional toroidal inductor uses a single ferromagnetic core for its construction, thus forcing the overall geometry of the part to follow its shape, an inductor as disclosed herein may uses several comparatively smaller toroidal cores in order to produce an inductor of equivalent electrical characteristics, but adding three dimensional configurability to its geometry. This may be of particular benefit when designing to a chassis printed circuit board that is often specified at inception to comply with height and width constraints for inclusion within a downhole tool with limited size constraints.

Moreover, by using a single length of wire, the insertion of an inductor according to the present disclosure within a given circuit may be conveniently limited to two points. This feature may provide an advantage to alternatively implementing a number of discrete single core inductors electrically in series, with each inductor requiring individual soldering to the printed circuit board in order to achieve the same purpose.

As described herein, inductor 200 may result in improved rationalization of circuit space, leading to higher power densities per unit of volume, which may be particularly useful in power converters and other circuits in downhole tools, where availability of housing space is often constrained to a bare minimum. Inductor 200 may be constructed from readily available off-the-shelf parts, thus reducing the number of cases when it may be necessary to design and order custom cores, expediting construction, and lowering costs.

In summary, an inductor, a downhole tool, and a method for forming an inductor have been described. Embodiments of the inductor may generally have: A generally toroidal ferromagnetic first core having a first aperture formed therethrough along a first axis; a generally toroidal ferromagnetic second core having a second aperture formed therethrough along a second axis, the second core disposed in proximity to the first core so that the second axis is not coaxial with the first axis; a generally toroidal ferromagnetic third core having a third aperture formed therethrough along a third axis, the third core disposed in proximity to the first core so that the third axis is not coaxial with the first axis; and an electrically conductive wire forming a first coil wound about the first and second cores passing through the first and second apertures and a second coil wound about the first and third cores passing through the first and third apertures, the wire not forming a coil wound about the second and third cores passing through the second and third apertures. Embodiments of the inductor may also generally have: A non-coaxial array of at least four generally toroidal ferromagnetic cores; and an electrically conductive wire forming coils wound through pairs of proximate cores within the array to create an arrangement whereby all coils wound about a given core in the array operate to produce magnetic flux flowing in the same direction within the given core upon imposition of an electrical current through the wire. Embodiments of the downhole tool may generally have: A housing; a non-coaxial array of at least four generally toroidal ferromagnetic cores disposed within the housing; and an electrically conductive wire disposed in the housing and forming coils wound through pairs of proximate cores within the array to create an arrangement whereby all coils wound about a given core in the array operate to produce magnetic flux flowing in the same direction within the given core upon imposition of an electrical current through the wire. Embodiments of the method may generally include: Providing a generally toroidal ferromagnetic first core having a first aperture formed therethrough along a first axis; disposing a generally toroidal ferromagnetic second core having a second aperture formed therethrough along a second axis in proximity to the first core so that the second axis is not coaxial with the first axis; disposing a generally toroidal ferromagnetic third core having a third aperture formed therethrough along a third axis in proximity to the first core so that the third axis is not coaxial with the first axis; disposing a generally toroidal ferromagnetic fourth core having a fourth aperture formed therethrough along a fourth axis in proximity to the third core so that the fourth axis is not coaxial with the third axis; and winding an electrically conductive wire to form a first coil about the first and second cores passing through the first and second apertures, a second coil about the first and third cores passing through the first and third apertures, and a third coil about the third and fourth cores passing through the third and fourth apertures.

Any of the foregoing embodiments may include any one of the following elements or characteristics, alone or in combination with each other: A generally toroidal ferromagnetic fourth core having a fourth aperture formed therethrough along a fourth axis, the fourth core disposed in proximity to the third core so that the fourth axis is not coaxial with the third axis; the wire forming a third coil wound about the third and fourth cores passing through the third and fourth apertures; the fourth core is disposed in proximity to the second core so that the fourth axis is not coaxial with the second axis; the wire forms a fourth coil wound about the fourth and second cores passing through the fourth and second apertures; the first axis is parallel to the fourth axis; the second axis is parallel to the third axis; the first axis is perpendicular to the second axis; the first axis is parallel to the second axis; a generally toroidal ferromagnetic fourth core having a fourth aperture formed therethrough along a fourth axis, the fourth core disposed in proximity to the first core so that the fourth axis is not coaxial with the first axis; a generally toroidal ferromagnetic fifth core having a fifth aperture formed therethrough along a fifth axis, the fifth core disposed in proximity to the first core so that the fifth axis is not coaxial with the first axis; the wire forming a third coil wound about the first and fourth cores passing through the first and fourth apertures and a fourth coil wound about the first and fifth cores passing through the first and fifth apertures; the array is characterized by a polygonal shape; the array is generally planar; and winding the wire to form a fourth coil about the second and fourth cores passing through the second and fourth apertures.

The Abstract of the disclosure is solely for providing the reader a way to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. An apparatus, comprising:

a downhole logging tool disposed within a wellbore;

a housing located within the downhole logging tool;

an instrument configured to take downhole measurements;

a printed circuit board positioned within the housing, wherein the printed circuit board is coupled to the instrument; and a multicore inductor coupled to the printed circuit board, the multicore inductor being shaped to fit within the housing, wherein the multicore inductor comprises:

a generally toroidal ferromagnetic first core having a first aperture formed therethrough along a first axis;

a generally toroidal ferromagnetic second core having a second aperture formed therethrough along a second axis, said second core disposed in proximity to said first core so that said second axis is not coaxial with said first axis;

a generally toroidal ferromagnetic third core having a third aperture formed therethrough along a third axis, said third core disposed in proximity to said first core so that said third axis is not coaxial with said first axis; and an electrically conductive wire forming a first coil wound about said first and second cores passing through said first and second apertures and a second coil wound about said first and third cores passing through said first and third apertures, said wire not forming a coil wound about said second and third cores passing through said second and third apertures.

2. The inductor of claim 1 further comprising:

a generally toroidal ferromagnetic fourth core having a fourth aperture formed therethrough along a fourth axis, said fourth core disposed in proximity to said third core so that said fourth axis is not coaxial with said third axis;

said wire forming a third coil wound about said third and fourth cores passing through said third and fourth apertures.

3. The inductor of claim 2 wherein:

said fourth core is disposed in proximity to said second core so that said fourth axis is not coaxial with said second axis; and said wire forms a fourth coil wound about said fourth and second cores passing through said fourth and second apertures.

4. The inductor of claim 2 wherein:

said first axis is parallel to said fourth axis; and said second axis is parallel to said third axis.

5. The inductor of claim 4 wherein:

said first axis is perpendicular to said second axis.

6. The inductor of claim 4 wherein:

said first axis is parallel to said second axis.

7. The inductor of claim 1 further comprising:

a generally toroidal ferromagnetic fourth core having a fourth aperture formed therethrough along a fourth axis, said fourth core disposed in proximity to said first core so that said fourth axis is not coaxial with said first axis; and a generally toroidal ferromagnetic fifth core having a fifth aperture formed therethrough along a fifth axis, said fifth core disposed in proximity to said first core so that said fifth axis is not coaxial with said first axis;

said wire forming a third coil wound about said first and fourth cores passing through said first and fourth apertures and a fourth coil wound about said first and fifth cores passing through said first and fifth apertures.

8. An apparatus, comprising:

a downhole logging tool disposed within a wellbore;

a housing located within the downhole logging tool;

an instrument configured to take downhole measurements;

a printed circuit board positioned within the housing, wherein the printed circuit board is coupled to the instrument; and a multicore inductor coupled to the printed circuit board, the multicore inductor being shaped to fit within the housing, wherein the multicore inductor comprises:

a non-coaxial array of at least four generally toroidal ferromagnetic cores; and an electrically conductive wire forming coils wound through pairs of proximate cores within said array to create an arrangement whereby all coils wound about a given core in said array operate to produce magnetic flux flowing in the same direction within said given core upon imposition of an electrical current through said wire.

9. The inductor of claim 8, wherein:

said array is characterized by a polygonal shape.

10. The inductor of claim 8, wherein:

said array is generally planar.

11. A downhole logging tool, comprising:

a housing located within the downhole logging tool;

an instrument configured to take downhole measurements;

a printed circuit board positioned within the housing, wherein the printed circuit board is coupled to the instrument; and a multicore inductor coupled to the printed circuit board, the multicore inductor being shaped to fit within a space within the housing;

wherein the multicore inductor comprises:

a non-coaxial array of at least four generally toroidal ferromagnetic cores; and an electrically conductive wire disposed in said housing and forming coils wound through pairs of proximate cores within said array to create an arrangement whereby all coils wound about a given core in said array operate to produce magnetic flux flowing in the same direction within said given core upon imposition of an electrical current through said wire.

12. The downhole tool of claim 11, wherein:

a first core of said array has a first aperture formed therethrough along a first axis;

a second core of said array has a second aperture formed therethrough along a second axis, said second core disposed in proximity to said first core so that said second axis is not coaxial with said first axis;

a third core of said array has a third aperture formed therethrough along a third axis, said third core disposed in proximity to said first core so that said third axis is not coaxial with said first axis; and said wire forms a first coil wound about said first and second cores passing through said first and second apertures and a second coil wound about said first and third cores passing through said first and third apertures.

13. The downhole tool of claim 12 wherein:

a fourth core of said array has a fourth aperture formed therethrough along a fourth axis, said fourth core disposed in proximity to said third core so that said fourth axis is not coaxial with said third axis; and said wire forms a third coil wound about said third and fourth cores passing through said third and fourth apertures.

14. The downhole tool of claim 13 wherein:

said fourth core is disposed in proximity to said second core so that said fourth axis is not coaxial with said second axis; and said wire forms a fourth coil wound about said fourth and second cores passing through said fourth and second apertures.

15. The downhole tool of claim 13 wherein:

said first axis is parallel to said fourth axis; and said second axis is parallel to said third axis.

16. The downhole tool of claim 15 wherein:

said first axis is perpendicular to said second axis.

17. The downhole tool of claim 15 wherein:

said first axis is parallel to said second axis.

18. A method for forming an inductor, comprising:

determining geometric space constraints of a downhole logging tool to be disposed within a wellbore, wherein the downhole logging tool contains a housing;

placing an instrument within the housing;

designing a printed circuit board to fit within the housing, wherein the printed circuit board is coupled to the instrument;

providing a generally toroidal ferromagnetic first core having a first aperture formed therethrough along a first axis;

disposing a generally toroidal ferromagnetic second core having a second aperture formed therethrough along a second axis in proximity to said first core so that said second axis is not coaxial with said first axis;

disposing a generally toroidal ferromagnetic third core having a third aperture formed therethrough along a third axis in proximity to said first core so that said third axis is not coaxial with said first axis;

disposing a generally toroidal ferromagnetic fourth core having a fourth aperture formed therethrough along a fourth axis in proximity to said third core so that said fourth axis is not coaxial with said third axis;

winding an electrically conductive wire to form a first coil about said first and second cores passing through said first and second apertures, a second coil about said first and third cores passing through said first and third apertures, and a third coil about said third and fourth cores passing through said third and fourth apertures; and coupling a multicore inductor to the printed circuit board, wherein the multicore inductor is shaped to fit within a tool housing space constraint.

19. The method of claim 18 wherein:

winding said wire to form a fourth coil about said second and fourth cores passing through said second and fourth apertures.

* * * * *